United States Patent
Rolland et al.

(10) Patent No.: US 9,434,211 B2
(45) Date of Patent: Sep. 6, 2016

(54) LAYERED TIRE TREAD DESIGN FOR IMPROVED COAST BY NOISE AND TRACTION PERFORMANCE

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventors: Maxime Rolland, Greer, SC (US); Dmitri Tsihlas, Greer, SC (US)

(73) Assignees: MICHELIN RECHERCHE et TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 250 days.

(21) Appl. No.: 13/873,914

(22) Filed: Apr. 30, 2013

(65) Prior Publication Data
US 2013/0284335 A1 Oct. 31, 2013

Related U.S. Application Data

(60) Provisional application No. 61/640,424, filed on Apr. 30, 2012.

(51) Int. Cl.
*B60C 11/12* (2006.01)
*B60C 11/03* (2006.01)
*B60C 11/04* (2006.01)

(52) U.S. Cl.
CPC ............ *B60C 11/03* (2013.01); *B60C 11/0306* (2013.04); *B60C 11/0323* (2013.04); *B60C 11/04* (2013.01); *B60C 11/1281* (2013.04)

(58) Field of Classification Search
None
See application file for complete search history.

(56) References Cited

U.S. PATENT DOCUMENTS

| | | | |
|---|---|---|---|
| 6,443,199 B1 * | 9/2002 | Scarpitti et al. | 152/209.1 |
| 6,443,200 B1 | 9/2002 | Lopez | |
| 6,910,381 B2 | 6/2005 | Albert et al. | |
| 7,249,620 B2 * | 7/2007 | Croissant et al. | 152/154.2 |
| 7,546,861 B2 * | 6/2009 | Nguyen et al. | 152/209.18 |
| 8,191,591 B2 | 6/2012 | Shimizu | |
| 8,511,356 B2 | 8/2013 | Ohashi | |
| 2006/0169377 A1 * | 8/2006 | Hashimoto et al. | 152/209.23 |

(Continued)

FOREIGN PATENT DOCUMENTS

| | | | |
|---|---|---|---|
| DE | 102010017702 | * | 1/2012 |
| JP | 2034406 | | 2/1990 |

(Continued)

OTHER PUBLICATIONS

English machine translation of JP2005-193815, dated Jul. 2005.*

*Primary Examiner* — Richard Crispino
*Assistant Examiner* — Robert Dye
(74) *Attorney, Agent, or Firm* — Dority & Manning, P.A.

(57) ABSTRACT

A tire tread having a layered design is provided. In a first layer of the tread, sipes extend transversely to provide traction in the first stage of the wear life of the tread. In a second layer of the tread, the width of the sipes along the circumferential direction is increased to provide for improved traction in a second stage of the wear life. The increased width is provided by a void that opens to a circumferential groove only along one end. Because the void opens only along one end, a decrease in acoustical effects such as drive by noise can be provided.

16 Claims, 8 Drawing Sheets

(56) References Cited

U.S. PATENT DOCUMENTS

| | | |
|---|---|---|
| 2007/0144641 A1 | 6/2007 | Nguyen et al. |
| 2010/0175799 A1 | 7/2010 | Takahashi et al. |
| 2011/0017374 A1 | 1/2011 | Bervas et al. |
| 2011/0108176 A1* | 5/2011 | Nakamizo et al. ...... 152/209.18 |
| 2011/0168311 A1 | 7/2011 | Voss et al. |
| 2011/0259487 A1 | 10/2011 | Montbel et al. |
| 2011/0277898 A1* | 11/2011 | Barraud et al. .......... 152/209.18 |
| 2012/0080130 A1 | 4/2012 | Scheuren |

FOREIGN PATENT DOCUMENTS

| | | | |
|---|---|---|---|
| JP | 10-076812 | * | 3/1998 |
| JP | 2001-063323 | * | 3/2001 |
| JP | 2001-130227 | * | 5/2001 |
| JP | 2001277815 | | 10/2001 |
| JP | 2005-193815 | * | 7/2005 |
| JP | 2009001206 | | 1/2009 |
| WO | WO2010/004898 | * | 1/2010 |
| WO | WO 2010/030276 | | 3/2010 |

* cited by examiner

LAYERED TIRE TREAD DESIGN FOR IMPROVED COAST BY NOISE AND TRACTION PERFORMANCE

PRIORITY CLAIM

This application claims priority to U.S. Provisional Patent Application No. 61/640,424 filed on Apr. 30, 2012. The foregoing provisional patent application is incorporated herein by reference for all purposes.

FIELD OF THE INVENTION

The subject matter of the present disclosure generally relates to a layered tread design for a tire, and more specifically, to such a tread that provides a better combination of coast by noise and traction on soft ground performances such as may be the case in snowy or muddy environments. Such a tread design may also provide suitable rolling resistance and tread wear performances.

BACKGROUND OF THE INVENTION

In general, the design and manufacture of a tire includes consideration of multiple factors such as e.g., tread wear, rolling resistance, traction, noise generation, and numerous others as well. Problems are encountered in attempting to optimize such factors because, conventionally, improvement of one factor may have a deleterious impact on one or more other factors. As such, typically a balance or compromise is selected.

For example, one common problem confronted in tire design and manufacture is how to maintain traction performance in soft ground conditions like e.g., mud and snow, over the wear life of the tread—particularly at later stages of wear life. Prior approaches have included treads having ribs that are separated by circumferentially extending grooves with the ribs divided into a plurality of segments by lateral incisions sometimes referred to as lamelles or sipes. Such designs can enhance tread life and/or rolling resistance performance while also providing for traction performance in soft ground conditions provided that the depth of the lamelles is relatively high. Unfortunately, however, as the tread wears and the depth of the lamelles is reduced, traction performance in soft ground conditions is reduced because the segments lose the ability to develop over pressure on the edges.

In an effort to compensate for the reduction in soft ground traction performance, the cross-sectional area of the lamelles in the contact patch can be increased by increasing the width of the lamelles along the circumferential direction. For example, a layered tread can be provided where the first layer contains relatively narrow lamelles in the early stages of tread wear that give way to relatively wider lateral grooves in a second layer that is revealed in later stages of tread wear. In the early stages of tread wear in the first layer, such lateral grooves exist as channels that are extended completely across the lateral width of the rib or tread block so as to open to circumferential grooves located on both lateral sides of the rib or tread block. As the tread wears down to the second layer to convert the channels into exposed lateral grooves, the width (along the circumferential direction) of such lateral grooves can enhance traction in soft ground such as mud or snow. However, despite the benefits of such design, certain challenges still remain.

For example, during the early stages of the wear life of the tread in the first layer, the lateral channels are positioned radially inward of tread rubber in the first layer. As such, the channels are compressed as the tire rolls through the contact patch, which causes the channels to pump air into the circumferential grooves on either side of the rib or tread block. This excitation of the air can lead to increase acoustical effects such as drive by or coast by noise. In addition, the lateral channels also induce discontinuities in the transmission of contact stresses from the ground to the casing through the tread, which causes higher vibratory excitation of the tire leading to additional acoustical effects such as coast by noise.

Accordingly, in view of the problems in the art including those set forth above, there is a need for a tire tread that can have improved traction performance on soft ground with a decrease in acoustical effects such as coast by noise. There is also a need for such a tire tread that can also have desirable levels of rolling resistance and/or wear life.

SUMMARY OF THE INVENTION

The present invention provides a tire tread having a layered design. In a first layer of the tread, sipes extend transversely to provide traction in the first stage of the wear life of the tread. In a second layer of the tread, the width of the sipes along the circumferential direction is increased to provide for improved traction in a second stage of the wear life. The increased width is provided by a void that opens to a circumferential groove only along one end. Because the void opens only along one end to a circumferential groove that is "hidden" during new or early stages of tread wear, a decrease in acoustical effects such as coast by noise can be provided. Additional aspects and advantages of the invention will be set forth in part in the following description, or may be apparent from the description, or may be learned through practice of the invention.

In one exemplary embodiment, the present invention provides a tire tread having a contact surface and defining transverse, radial, and circumferential directions. The tire tread includes a first circumferential groove extending along the circumferential direction and having a depth along the radial direction that extends from the contact surface. A second circumferential groove extends along the circumferential direction. A transverse sipe extends along the transverse direction and has a depth along the radial direction that extends from the contact surface. A void is positioned in the tread radially inward of the transverse sipe so that the void is hidden during a first stage of wear life of the tread and is revealed during a second stage of the wear life of the tread. The void is open along one side at the second circumferential groove. The void extends for a predetermined distance along the transverse direction towards the first circumferential groove and then ends along an opposing side at the transverse sipe without extending to the first circumferential groove. The void has a width along the circumferential direction that is greater than a corresponding width of the transverse sipe along the circumferential direction. The void and the transverse sipe are in fluid communication with each other along both the radial and transverse directions.

In another exemplary embodiment of the present invention, a tire tread is provided having transverse, radial, and circumferential directions. The tire tread includes one or more tread elements having a contact surface and including a first wear layer and a second wear layer. The second wear layer is located below the first wear layer so that the first wear layer is used during a first stage of the wear life of the tread and the second wear layer is exposed during a second stage of the wear life of the tread. A first circumferential groove extends along the circumferential direction of the tire and has a depth along the radial direction that extends into both the first wear layer and the second wear layer. A second circumferential groove extends along the circumferential direction of the tire and has a depth along the radial direction that is positioned in at least the second wear layer. A transverse sipe extends along the transverse direction and has a depth along the radial direction within the first and second wear layers. A void extends along the transverse direction and has a height along the radial direction that is contained within the second wear layer so that the void is exposed only during the second stage of the wear life of the tread. The void opens along one side to the second circumferential groove and ends along an opposing side at the transverse sipe without extending to the first circumferential groove. The transverse sipe and void each have a width along the circumferential direction. The width of the void along the circumferential direction is greater than the width of the transverse sipe along the circumferential direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Groove" means a channel-like tread feature having a width of at least about 2 mm.

"Sipe" or "lamelle" means a channel-like tread feature having a width of less than about 2 mm. In general, a sipe has an appropriate width so that during rolling there is at least partial contact between the two faces of the sipe when crossing through the contact patch whereas grooves do not usually generate such contact during normal usage conditions.

"Transverse sipe" means a sipe that extends along the general transverse direction T of the tire and does not extend around the tire along the general circumferential direction C. That is to say, any sipe that extends in a general transverse direction or is within 45 degrees of that direction is considered to be a transverse sipe.

"Circumferential groove" means a groove that extends around the tire along the general circumferential direction. In other words, any groove that extends in a general circumferential direction or is within 45 degrees of that direction is considered to be a circumferential groove.

Depth "D" as used herein refers to the depth of a feature along the radial direction as measured from the contact surface of the tread in a new or non-worn state at the beginning of the first stage of the wear life of the tread.

Figure 1:
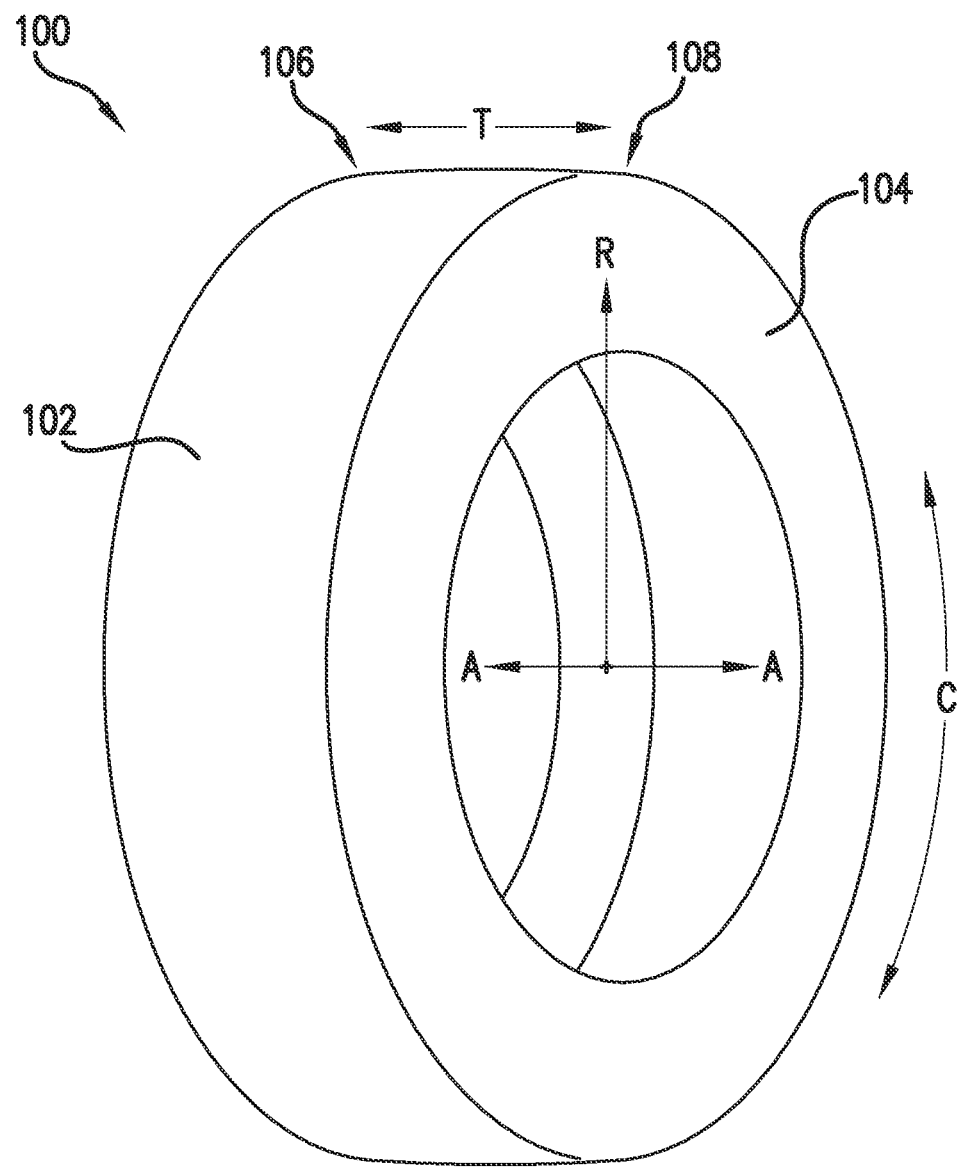
FIG. 1 provides a schematic, perspective view of an exemplary embodiment of a tire as may be provided with a tread of the present invention.

FIG. 1 provides a schematic, perspective view of an exemplary embodiment of a tire 100 as may be provided with an exemplary tread of the present invention and is also used here to provide further definitions helpful in describing the invention. Tire 100 defines a circumferential direction as indicated by arrows C that extends around the tire. Tire 100 also defines a lateral or transverse direction is indicated by arrows T that is parallel to the axis of rotation of the tire or its axial direction as denoted by arrows A. The radial direction is parallel to a line drawn perpendicular to the axis of rotation A as denoted by arrow R. A tread 102 extends circumferentially about tire 100 between shoulder regions 106 and 108. Tire 100 also includes a pair of opposing sidewalls one of which, sidewall 104, is shown in FIG. 1.

Figure 2:
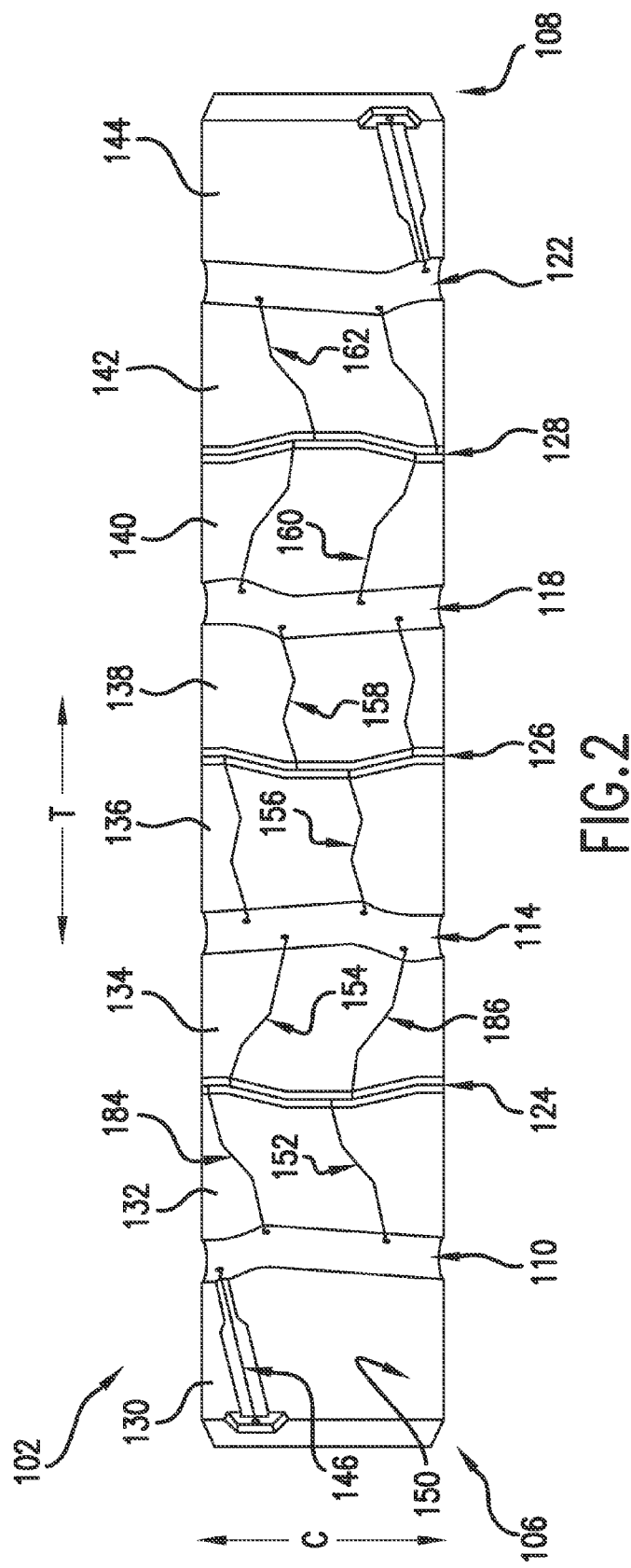
FIG. 2 provides a top view of a portion of an exemplary embodiment of a tire tread of the present invention in the first stage of its wear life. This top view also illustrates the top view of the first layer of this exemplary tire tread.
Figure 3:
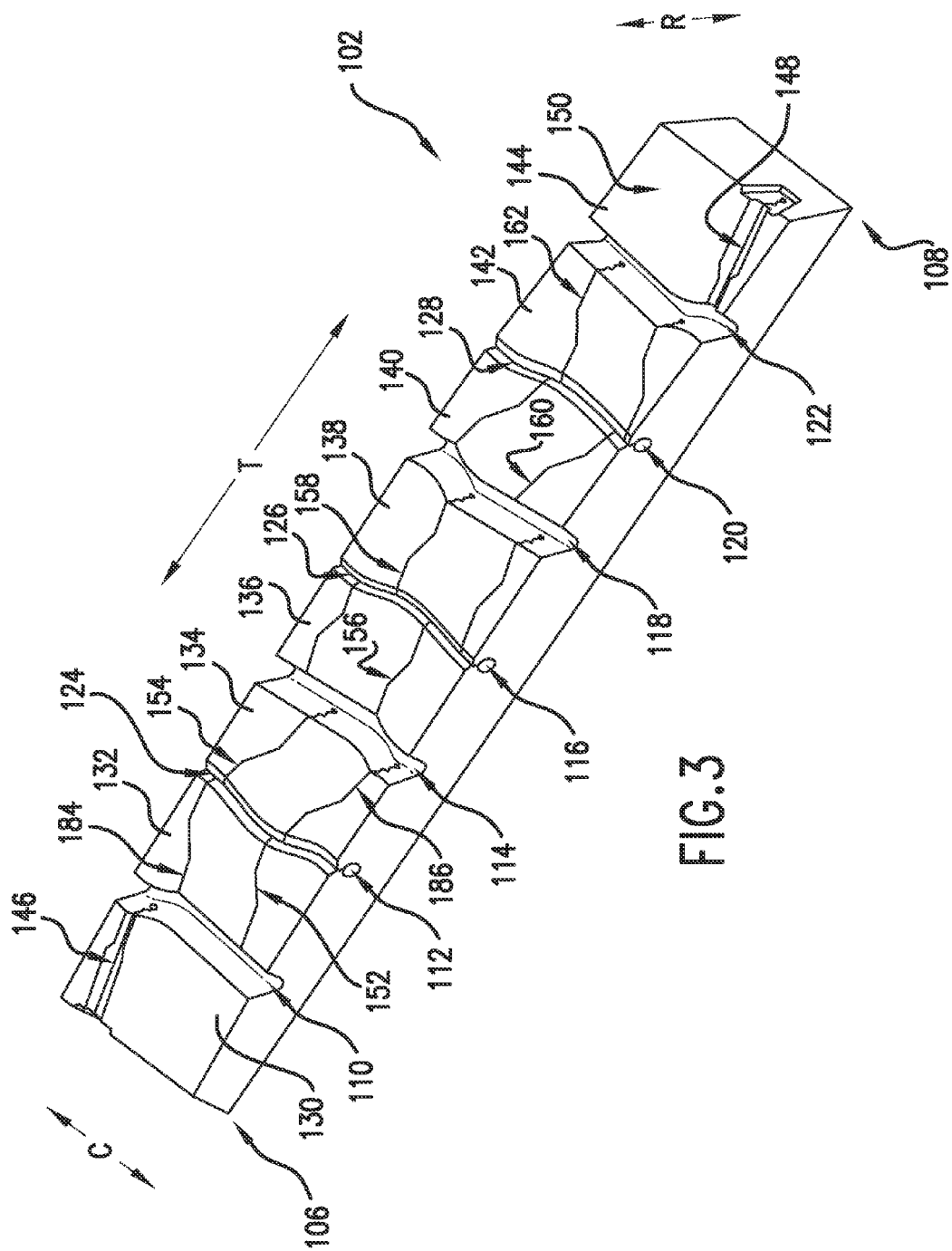
FIG. 3 provides a perspective view of the exemplary tire tread portion of FIG. 2.
Figure 6:
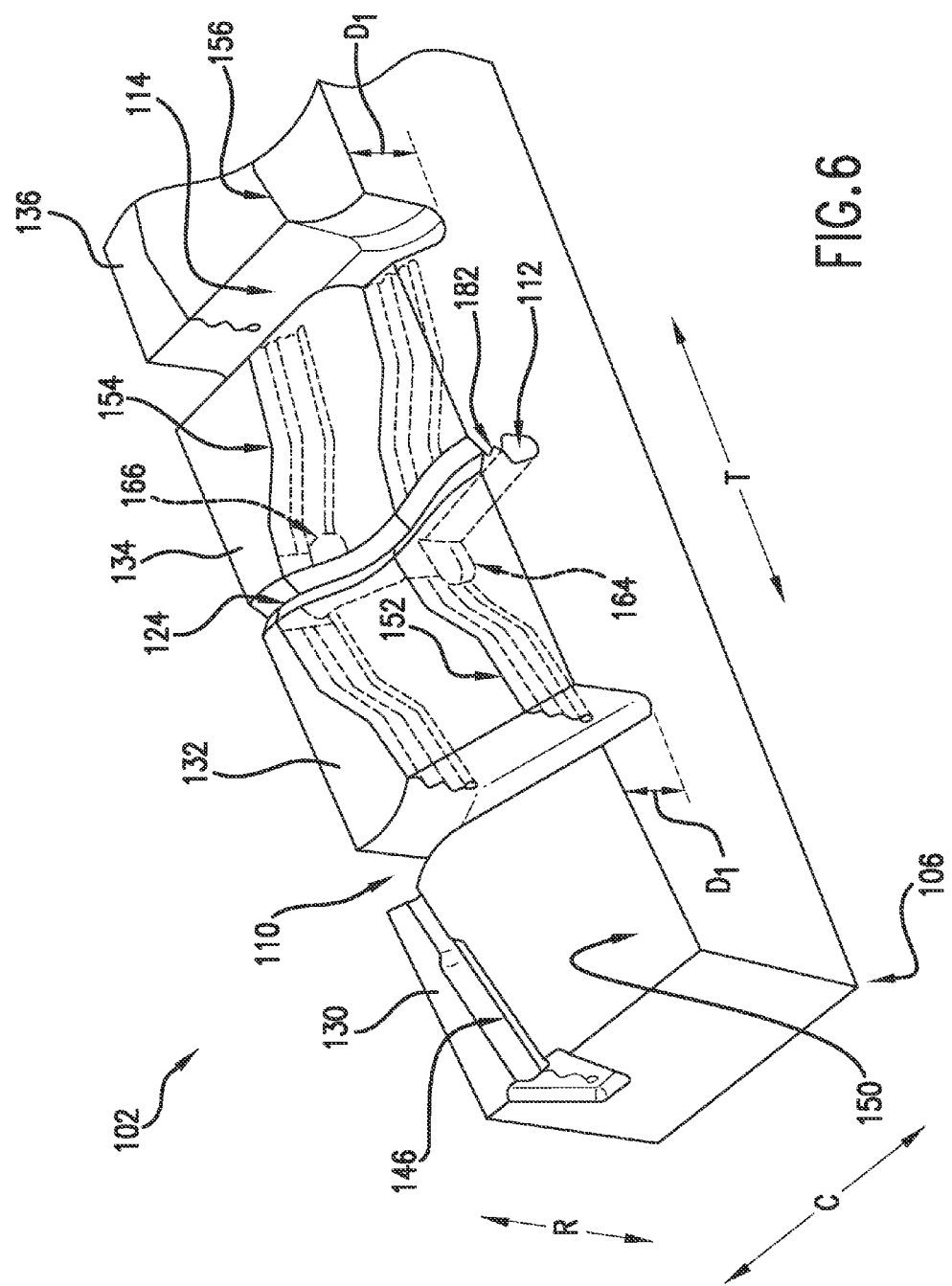
FIG. 6 illustrates a close-up perspective view of one side of the exemplary tire tread portion of FIG. 2 showing hidden features with dashed lines.

FIG. 2 provides a top view of a portion an exemplary embodiment of a tire tread 102 of the present invention in the first stage of its wear life. FIG. 2 also illustrates the appearance of tread 102 while in its first wear layer. FIG. 3 provides a perspective view of the exemplary tire tread portion 102 of FIG. 2. FIG. 6 illustrates a close-up perspective view of one shoulder region 106 of the exemplary tire tread portion of FIG. 2.

As shown, tread 102 includes a plurality of first circumferential grooves 110, 114, 118, and 122 that extend along the circumferential direction C and have a depth D1 along the radial direction R that extends from the contact surface 150. In this first stage of the wear life of the tread 102, grooves 110, 114, 118, and 122 are exposed or open. During the second stage of the wear life of tread 102, grooves 110, 114, 118, and 122 remain exposed or open as will be further described.

Figure 7:
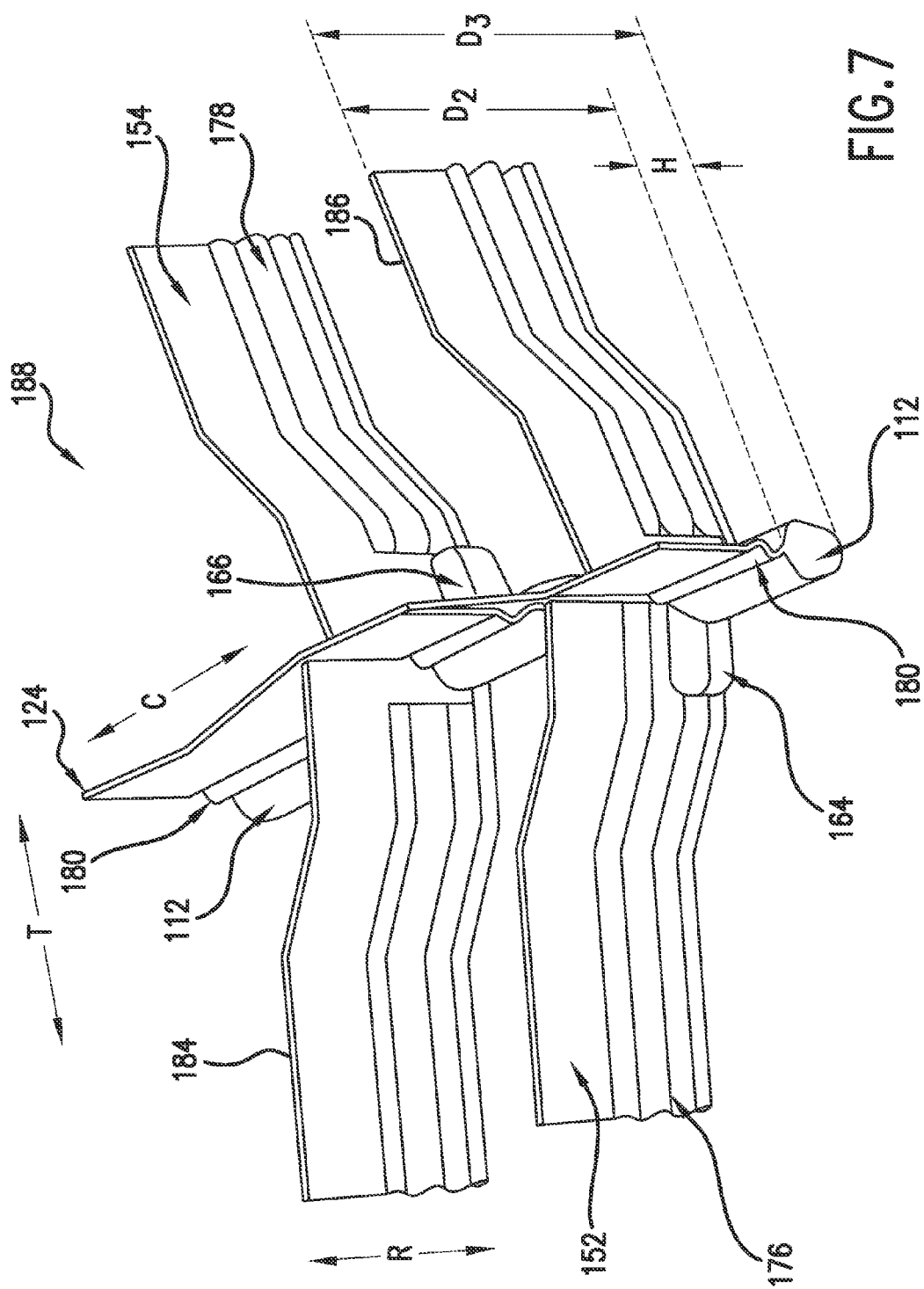
FIG. 7 illustrates the void volume (and, therefore, a mold part) associated with a certain portion of the exemplary tread portions of FIGS. 2 and 3 as will be further described. This geometry also represents the configuration of a mold member that forms void volume in the tread.

Tread 102 also includes a plurality of second circumferential grooves 112, 116, and 120 that also extend along the circumferential direction C. As shown in FIG. 7, second circumferential grooves 112, 116, and 120 have a height H along the radial direction that extends from depth D2 to depth D3. Accordingly, in this first stage of the wear life of the tread, grooves 112, 116, and 120 remain covered or hidden by other portions of tread 102. At a position radially outward of grooves 112, 116, and 120, tread 102 includes circumferential sipes 124, 126, and 128, respectively, which also extend along the circumferential direction C. Each circumferential sipe 124, 126, and 128 has a depth along the radial direction R that extends from contact surface 150 to top depth D2 and connect with grooves 112, 116, and 120 so that such are in slight fluid communication with each other as this communication is limited due to the width of the sipe being less than 2 mm. As shown, sipes 124, 126, and 128 undulate or include undulations (see, e.g., undulations 182 in FIG. 6) along the radial direction R and circumferential direction C in order to provide greater rigidity of the tread. The walls or faces creating sipes 124, 126, and 128 are in contact with each other when present in the contact patch during tire operation. In other exemplary embodiments of the present invention, sipes 124, 126, and 128 can have different configurations or can be eliminated.

Together, circumferential grooves 110, 112, 114, 116, 118, 120, and 122, along with sipes 124, 126, 128 create a plurality of ribs. These ribs include shoulder ribs 130 and 144 along with interior ribs 132, 134, 136, 138, 140, and 142. The circumferential grooves are positioned between these ribs. For example, first circumferential groove 110 is positioned between the first rib 130 and the second rib 132. The shoulder ribs 130 and 144 are provided with transverse sipes 146 and 148, respectively. In other exemplary embodiments of the present invention, sipes 146 and 148 can have different configurations or can be eliminated.

As will be understood by one of skill in the art using the teachings disclosed herein, the number of such grooves and ribs along with the aesthetics of tread portion 102 as shown in the figures is provided by way of example only. Numerous other exemplary embodiments of the present invention may be provided with differing numbers of grooves, shapes, aesthetic features and other configurations. Also, the present invention may also be used with tread blocks instead of ribs as well.

Continuing with FIGS. 2, 3, and 6, tread 102 also includes a plurality of transverse sipes 152, 154, 156, 158, 160, and 162 that extend along the transverse direction T and have a depth that extends along the radial direction R. As shown in FIG. 6 using sipe 152 as an example, sipe 152 is open on one lateral (or transverse) side to first circumferential groove 110 and is open on another lateral side to second circumferential groove 112. Sipe 152 also includes undulations 176 (FIG. 7) along the radial direction. Descriptions similar to that provided for sipe 152 apply to transverse sipes 154, 156, 158, 160, and 162. Thus, during the first stage of the wear life of tread 102, sipes 154, 156, 158, 160, and 162 help provide e.g., traction in soft surfaces such as mud and snow.

Additionally, for each of sipes 152, 154, 156, 158, 160, and 162, a void is positioned radially inward of at least part of each such sipe. For example, using sipe 152 as shown in FIG. 6 as an example, void 164 is positioned radially inward of a portion of sipe 152. As such, void 164 is hidden or covered during the first stage of wear life of tread 102 and is revealed or uncovered during a second stage of the wear life of tread 102 as will be further described.

As also shown in FIG. 6, void 164 is open along one side at second circumferential groove 112 and extends for a predetermined distance along the transverse direction T into rib 132 and towards first circumferential groove 110 but without extending all the way to first circumferential groove 110. Thus, void 164 is open along one side to second circumferential groove 112 but ends along the opposing side at transverse sipe 152 such that sipe 152 and void 164 are in slight fluid communication with each other along both the radial direction R and transverse direction T. Void 164 also has a width along circumferential direction C that is greater than a corresponding width of transverse sipe 152 along circumferential direction C. Descriptions similar to that provided for void 164 apply to voids 166, 168, 170, 172, and 174.

Figure 4:
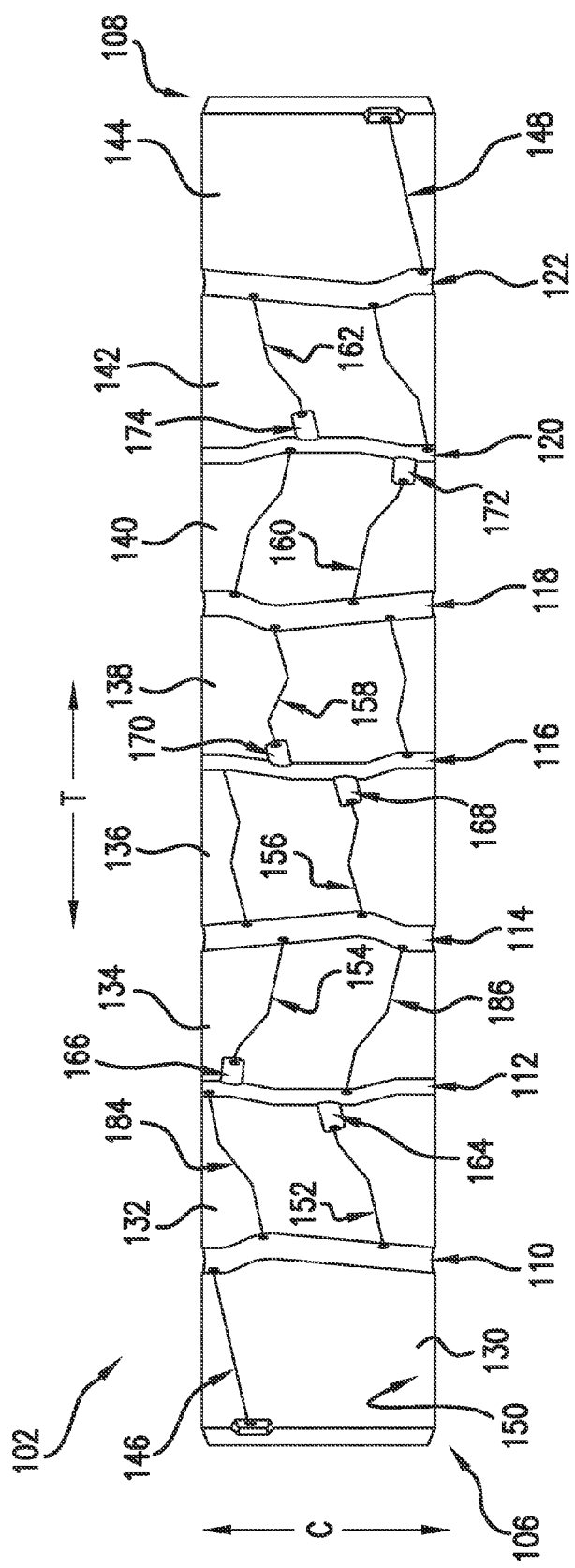
FIG. 4 illustrates a top view of a portion of a second layer of an exemplary embodiment of a tire tread of the present invention in the second stage of its wear life.
Figure 5:
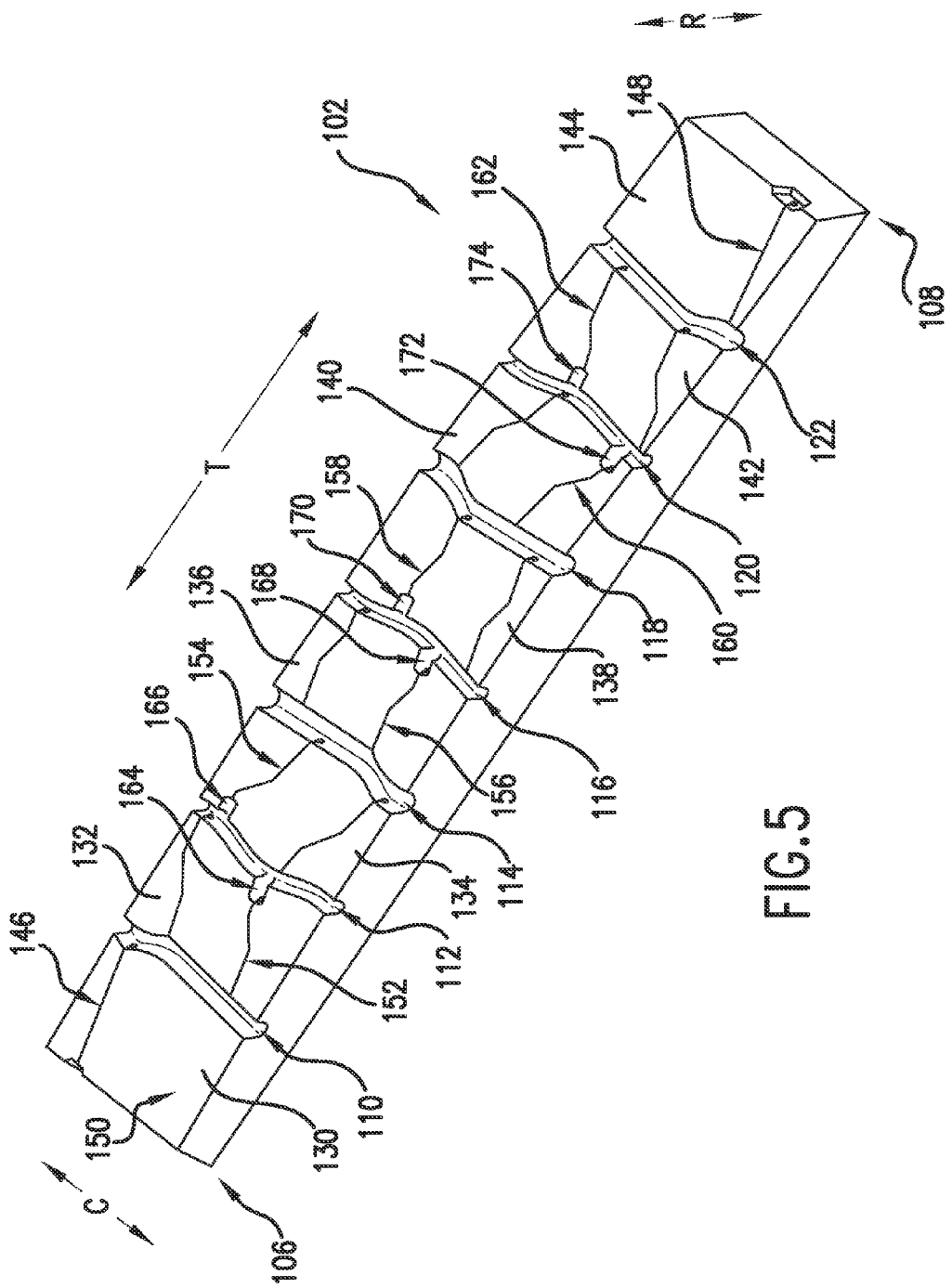
FIG. 5 provides a perspective view of the exemplary tire tread portion of FIG. 4.

FIG. 4 provides a top view of the same portion of exemplary tire tread 102 as shown in FIG. 2 except that in FIG. 4, due to wear from use, tread 102 has reached the second stage of its wear life. As such, FIG. 4 also illustrates the appearance of tread 102 while in its second wear layer. FIG. 5 provides a perspective view of the exemplary tire tread portion 102 of FIG. 4.

As shown, due to wear of tread 102, voids 164, 166, 168, 170, 172, and 174 are now uncovered or exposed as tread 102 reaches the second wear layer so as to enter the second stage of its wear life. The circumferential width of such voids now acts as a transverse groove to enhance traction in soft ground conditions. In addition, because voids 164, 166, 168, 170, 172, and 174 do not extend completely through their respective ribs, the undesired acoustic effects resulting from compression and vibratory excitation that are associated with channels that extend completely between circumferential grooves can be reduced when the tread is new.

FIG. 7 illustrates the void volume 188 associated with a part of the exemplary tread portion 102 of FIGS. 2 and 3. More particularly, the void volume 188 associated with sipes 152, 154, 184, 186, with voids 164 and 166, with circumferential sipe 124, and second circumferential groove 112 is shown. During the first stage of the wear life of tread 102, wear occurs through a first wear layer of tread, which extends from contact surface 150 down to top depth D2. As such, during the first stage of wear life of tread 102, voids such as voids 164 and 166 remain covered or hidden. Similarly, second circumferential grooves such as groove 112 also remain covered or hidden. As tread 102 wears, it enters a second stage of wear life as the second wear layer is reached. The second wear layer is radially inward of the first wear layer and extends from top depth D2 to bottom depth D3.

Figure 8:
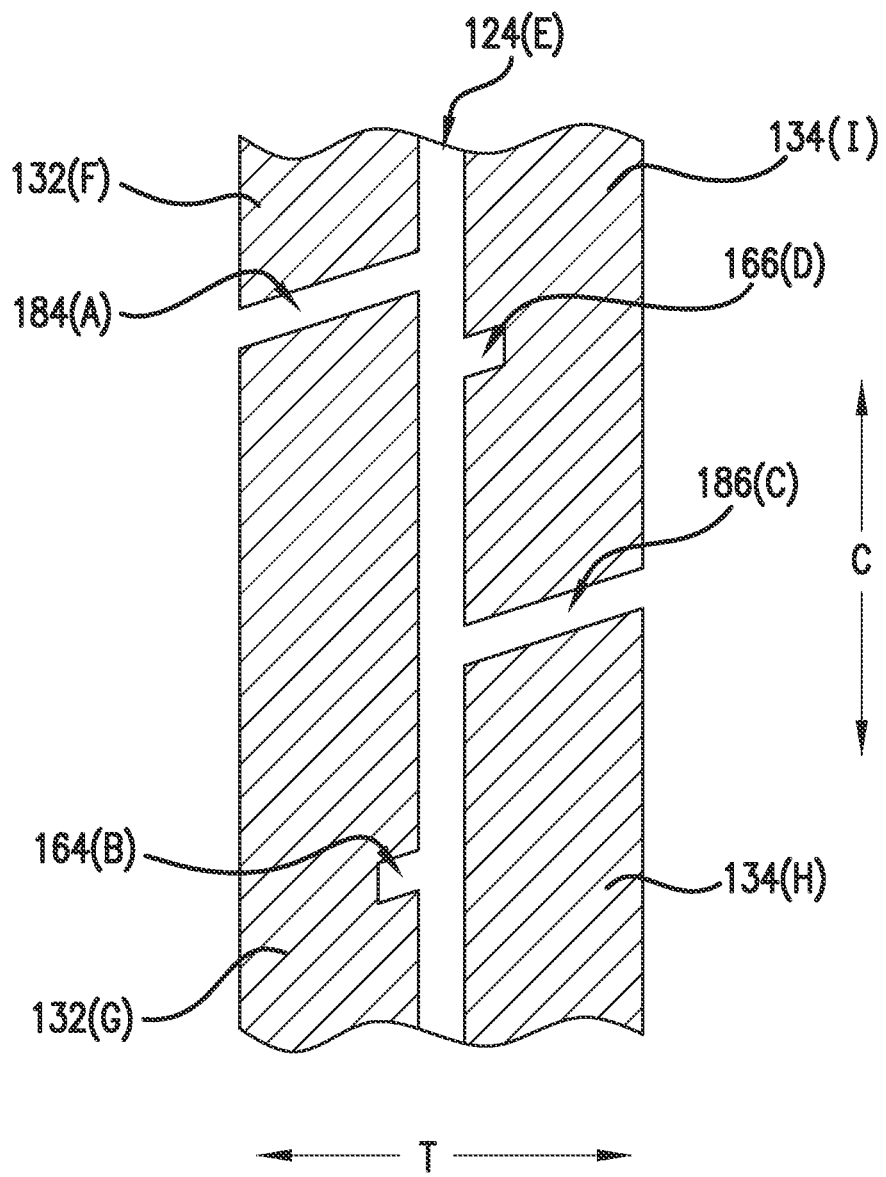
FIG. 8 provides a schematic, top down view of a part of the exemplary tread portion of FIGS. 2 and 3 as will be further described.

FIG. 8 provides a schematic, top down view of a portion of the exemplary tread 102 of FIG. 2 along second circumferential sipe 124. More specifically, FIG. 8 schematically illustrates the portions of ribs 132 and 134 that make contact with a ground surface as a tire having tread 102 rolls through its contact patch. As shown, voids 164 and 166 along with sipes 184 and 186 (the width of which has been exaggerated for purposes of clarity) represent areas that do not contact the ground surface as the tread 102 rolls through the contact patch. The ratio of the sum of the areas of the non-ground contacting portions of tread 102 to the sum of the total area of tread 102 (including ground contacting portions and non-ground contacting portions) as tread 102 rolls through the contact patch can be defined as $CSR_T$. For the portion shown in FIG. 8, this can be calculated per rib. For example, for rib 132, $CSR_T$ can be calculated as $$CSR_T = ((A+B)/(A+B+F+G))*100 \qquad (1)$$

where A through G each represent the surface areas associated with each portion of the contact patch shown in FIG. 8

In one exemplary embodiment of the present invention, each void 164, 166, 168, 170, 172, and 174 provides a $CSR_T$ value in the range of 0 to about 2 percent, or in still other embodiments, a $CSR_T$ value in the range of 0 to about 10 percent. The importance of this parameter will be discussed further below.

For the embodiment described herein, the tire was a 445/50R22.5 size with a tread width of 395 mm. The various depths of the tread features were as follows: D1 was about 16.5 mm, D2 was about 7.5 mm, and D3 was about 16.5 mm. Also, the width of the circumferential grooves 110, 114, 118 and 122 was about 13 mm, and the width of circumferential submerged groove 112, 116, and 120 was about 6 mm, with a depth of about 9 mm. Also, the width, height and length of each of voids 164, 166, 168, 170, 172, and 174 was about 7, 9, and 7 mm, respectively. Note that these structures, including hidden and unhidden grooves and associated sipes can be molded using a mold member network similar to what is shown and described in Patent Application Publication No. 2011168311A. It is also contemplated that the hidden voids or grooves described herein could be made using other techniques such as inserts that fall out of the tread once the tread wears to the level that an insert begins so as to eliminate the need for a sipe to connect the hidden feature to the surface of the tread or another tread feature formed by another mold component.

The lack of grooves over the circumferential sipes 124, 126 and 128 allows an increase in tread rigidity which can improve rolling resistance and tread wear. At the same time, the transverse distance between the circumferential grooves is substantially maintained, helping to keep wet traction and hydroplaning performances the same. Advantageously, additional hidden circumferential grooves are located under these exposed grooves so that as the tread wears, the volumetric void is replaced allowing wet traction to be maintained over time. This phenomena can be explained discussing several parameters.

The first is CSR, which is the ratio of ground contacting area of the contact patch to the total area of the contact patch bounded by the theoretical boundary or perimeter of the contact patch. It is desirable to maintain a certain CSR for wet traction. This parameter measures the ability of the tread to introduce water or other matter into its network of grooves or other voids to allow the tire to contact the ground. If too much CSR is present, then the tire will be prone to hydroplaning because the water has no place to go and water pressure will build up, lifting the tire off the ground. If too little CSR is present, than not enough ground contact can be made for suitable wet traction. Also, low CSR can lead to problems associated with wear.

As can be seen, using the combination of shallow grooves under which hidden grooves are later exposed allows CSR to be maintained when the tread is new and when it is worn, which is good for wet traction while also allowing for improved tread rigidity over the life of the tire tread. CSR effectively measures the ability of the tread to allow water or other matter to enter is network of grooves and other voids. For this embodiment as stated previously, the CSR was about 0.87 when the tread is new and about 0.87 when the tread reaches the worn stage. A range of about 0.8 to about 0.9 is considered a preferable range of CSR when employing the present invention when the tire is new and 0.8 to about 0.95 when the tire is worn Another important parameter regarding wet traction is VVR or void volume ratio. This parameter measures the tread's ability to evacuate or communicate water or other matter away from the contact patch once the matter has entered the network of grooves or other voids of the tread. If the VVR is too high, then the tread rigidity can be compromised which leads to increased rolling resistance and tread wear. If too little VVR is present, then the water or other matter cannot be effectively removed from the contact patch quick enough, which can lead to a decreased wet traction performance and an increased probability of hydroplaning.

As can be seen, the void volume ratio has been substantially maintained by using the shallow circumferential grooves with hidden circumferential grooves underneath them without decreasing tread rigidity significantly. A range of about 0.1 to about 0.2 is considered a preferable range of VVR when employing the present invention when the tire is new and about 0.05 to about 0.2 when the tire is worn. In addition, coast by noise in the new state is reduced since there are no hidden transverse grooves that are in communication with exposed grooves through which pumped air can travel. It is further contemplated that a pocket or other passageway can be used to communicate fluid from the shallow circumferential grooves to the hidden grooves and voids to better use these features when the tread is unworn, effectively improving the tread's wet traction when the tread is new.

The final parameter is tread rigidity which is difficult to quantify. However, it can be dealt with qualitatively and by limiting the amount of exposed void when the tread is new. This can limit the negative impact on rolling resistance and tread wear performances.

While a certain sized tire with specific dimensions has been described, it is contemplated that other sized tires with features having different dimensions could be used and still fall within the scope of the appended claims. Also, the location of the various features such as pockets, voids, hidden grooves as well as deep and shallow circumferential grooves could be altered. Also, the configurations of the grooves could be changed in any manner known in the prior art for both exposed and hidden features. For example, negative draft angles could be employed and hidden transverse grooves could be found along the shoulders of the tire. It is preferable that any design alternatives have a suitable VRR, CSR and tread rigidity as the tread evolves or wears.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tire tread having a contact surface and defining transverse, radial, and circumferential directions, the tire tread comprising:
a pair of first circumferential grooves extending along the circumferential direction and each having a depth D1 along the radial direction from the contact surface;
a second circumferential groove extending along the circumferential direction and located between said pair of first circumferential grooves, wherein said second circumferential groove has a height along the radial direction that extends from a top depth D2 to a bottom depth D3 so that said second circumferential groove is covered in a first stage of wear life of the tire tread and is uncovered in a second stage of the wear life of the tread;

a transverse sipe extending along the transverse direction between said second circumferential groove and one of said first circumferential grooves, said transverse sipe and having a depth along the radial direction that extends from the contact surface;

a void positioned in the tread radially inward of said transverse sipe so that said void is hidden during the first stage of wear life of the tread and is revealed during the second stage of the wear life of the tread;

wherein said void is open along one side at said second circumferential groove, extends for a predetermined distance along the transverse direction towards said first circumferential groove, and then ends along an opposing side that is connected to said transverse sipe such that said transverse sipe extends along the transverse direction between the opposing side of the void and said first circumferential groove, and wherein said void has a width along the circumferential direction that is greater than a width along the circumferential direction of said transverse sipe.

2. A tire tread as in claim 1, the tire tread further comprising;
a circumferential sipe extending along the circumferential direction, said circumferential sipe having a depth along the radial direction that extends from the contact surface to top depth D2 so that said circumferential sipe and said second circumferential groove are in fluid communication.

3. A tire tread as in claim 2, wherein said circumferential sipe undulates along the radial direction.

4. A tire tread as in claim 1, wherein during the second stage of the wear life of the tread, said void provides a CSRT value in the range of about 0 to about 10 percent.

5. A tire tread as in claim 1, wherein during the second stage of the wear life of the tread, said void provides a CSRT value in the range of about 0 to about 2 percent.

6. A tire tread as in claim 1, wherein said transverse sipe undulates along the radial direction.

7. A tire tread as in claim 1, further comprising:
a first rib extending along the circumferential direction of the tire;
a second rib extending along the circumferential direction of the tire;
wherein one of said pair of first circumferential grooves are positioned between said first rib and said second rib.

8. A tire comprising the tire tread of claim 1.

9. A tire tread having transverse, radial, and circumferential directions, the tire tread comprising:
one or more tread elements having a contact surface and including a first wear layer and a second wear layer, wherein the second wear layer is located radially inward of the first wear layer so that the first wear layer is used during a first stage of the wear life of the tread and the second wear layer is exposed during a second stage of the wear life of the tread;

a first circumferential groove extending along the circumferential direction of the tire and having a depth along the radial direction that extends into both the first wear layer and the second wear layer;

a second circumferential groove extending along the circumferential direction of the tire and having a depth along the radial direction that is positioned in at least the second wear layer;

a transverse sipe extending along the transverse direction and having a depth along the radial direction within the first and second wear layers; and a void extending along the transverse direction and having a height along the radial direction that is contained within the second wear layer so that said void is exposed only during the second stage of the wear life of the tread, said void opening along one side to said second circumferential groove and ending along an opposing side at said transverse sipe with said transverse sipe extending transversely to said first circumferential groove from the opposing side of the void;

wherein said transverse sipe and said void each have a width along the circumferential direction, and wherein the width of said void along the circumferential direction is greater than the width of said transverse sipe along the circumferential direction, and wherein said second circumferential groove has a height along the radial direction that is contained within the second wear layer such that said second circumferential groove is exposed only during the second stage of the wear life of the tread.

10. A tire tread as in claim 9, wherein said transverse sipe undulates along the radial direction.

11. A tire tread as in claim 9, wherein upon reaching the second wear layer during the second stage of the wear life of the tread, said void provides a CSRT value in the range of about 0 to about 10 percent.

12. A tire tread as in claim 9, wherein upon reaching the second wear layer during the second stage of the wear life of the tread, said void provides a CSRT value in the range of about 0 to about 2 percent.

13. A tire tread as in claim 9, the tire tread further comprising;
a circumferential sipe extending along the circumferential direction, said circumferential sipe having a depth along the radial direction that extends from the contact surface through the first layer and to said second circumferential groove so that said circumferential sipe and said second circumferential groove are in fluid communication.

14. A tire tread as in claim 13, wherein said circumferential sipe undulates along the radial direction.

15. A tire tread as in claim 9, further comprising:
a first rib extending along the circumferential direction of the tire;
a second rib extending along the circumferential direction of the tire;
wherein said first circumferential groove is positioned between said first rib and said second rib.

16. A tire comprising the tire tread of claim 9.

* * * * *